United States Patent [19]

Mori

[11] Patent Number: 5,752,592
[45] Date of Patent: May 19, 1998

[54] METHOD OF CONTROLLING HYDRAULIC PRESSURE FOR ENGAGING CLUTCH IN AUTOMATIC TRANSMISSION

[75] Inventor: Kyosuke Mori, Fuji, Japan

[73] Assignee: JATCO Corporation, Fuji, Japan

[21] Appl. No.: 746,333

[22] Filed: Nov. 8, 1996

[51] Int. Cl.$^6$ ................................. F16D 48/06
[52] U.S. Cl. .................... 192/85 R; 102/109 F; 477/180
[58] Field of Search .............. 192/85 R, 109 F; 477/86, 158, 174, 180; 701/58, 68

[56] References Cited

U.S. PATENT DOCUMENTS

| | | | |
|---|---|---|---|
| 4,813,307 | 3/1989 | Hiramatsu et al. | 477/131 |
| 5,131,294 | 7/1992 | Yoshimura | 477/109 |
| 5,349,885 | 9/1994 | Yoshimura et al. | 477/61 |
| 5,429,561 | 7/1995 | Wakahara et al. | 477/156 |

FOREIGN PATENT DOCUMENTS 62-9054  1/1987  Japan.

*Primary Examiner*—Rodney H. Bonck
*Attorney, Agent, or Firm*—Foley & Lardner

[57] ABSTRACT

A method of controlling hydraulic pressure necessary for engaging a clutch in automatic transmission comprises correcting a friction factor in accordance with the relationship between a face pressure of the clutch corresponding to hydraulic pressure as provisionally determined and the friction factor, and correcting hydraulic pressure in accordance with the friction factor as corrected.

2 Claims, 2 Drawing Sheets

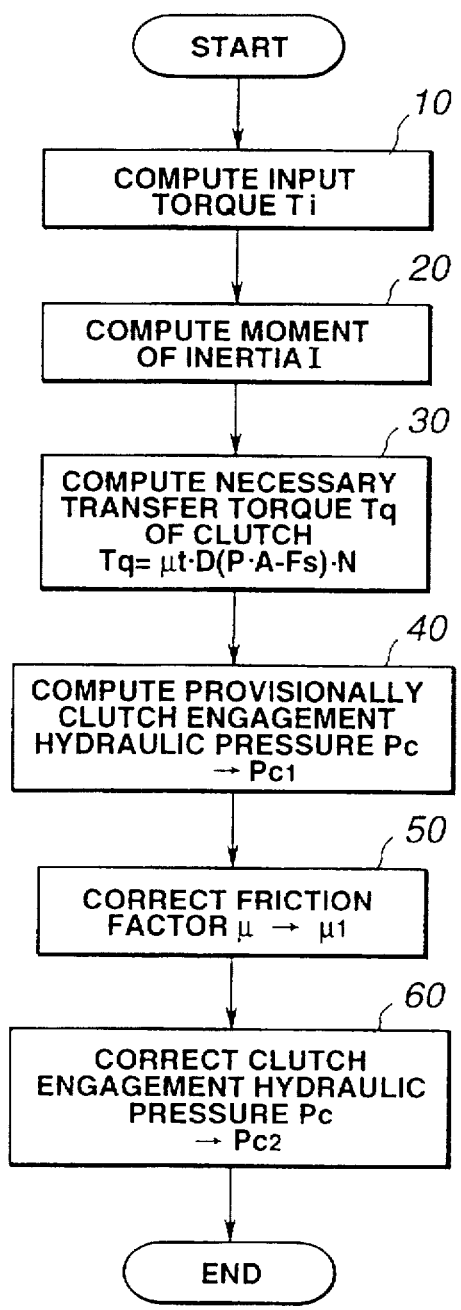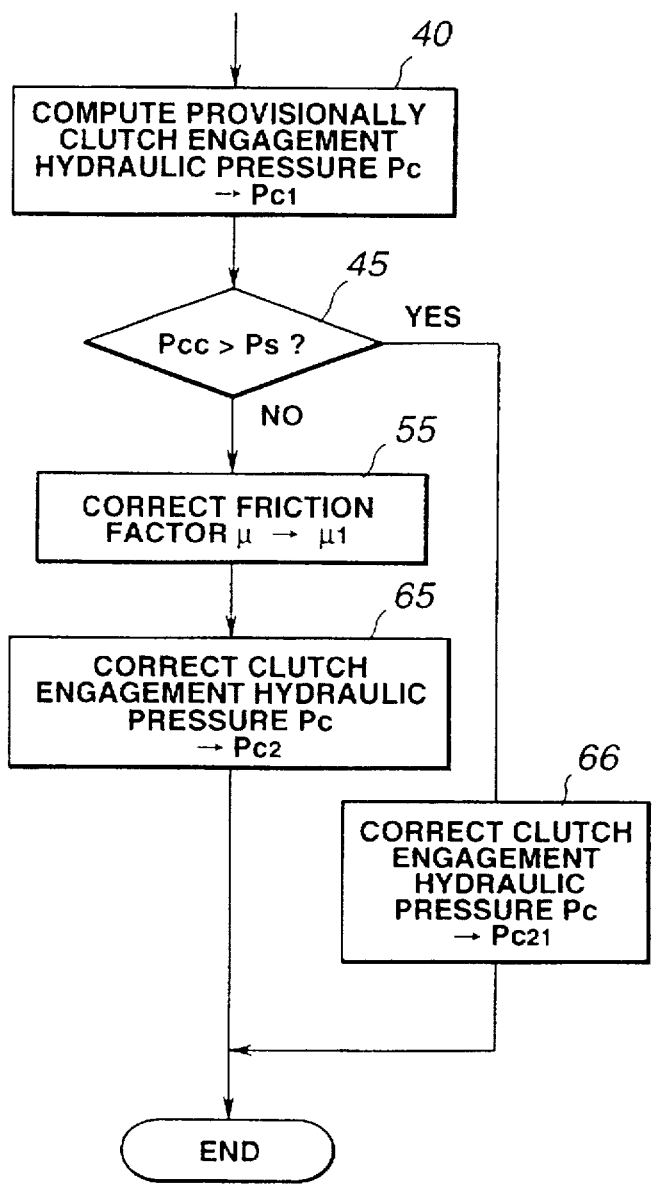

METHOD OF CONTROLLING HYDRAULIC PRESSURE FOR ENGAGING CLUTCH IN AUTOMATIC TRANSMISSION

BACKGROUND OF THE INVENTION

The present invention relates to a method of controlling hydraulic pressure for engaging a clutch in automatic transmission.

A line pressure controller for automatic transmission is conventionally known, for example, in JP-A 62-9054. The line pressure controller serves to generate line pressure corresponding to engine output in accordance with a fuel injection amount and an engine speed. Part of line pressure serves as hydraulic pressure for engaging a clutch specifically, hydraulic pressure necessary for clutch engagement is determined through computing out of a measured value of the fuel injection amount representative of input torque. It is noted that a measured value representative of input torque may be a measured torque value derived from a torque sensor.

However, due to its structure that clutch engagement hydraulic pressure is determined to correspond to input torque, the above known line pressure controller may deteriorate the shift performance. Specifically, when simply making clutch engagement hydraulic pressure correspond to input torque, a friction factor of the clutch simply corresponds to a relative revolving speed of the clutch. However, since an actual value of the friction factor varies with pressure applied to friction members of the clutch (refer hereafter to as clutch face pressure), i.e. a value of the friction factor is higher as clutch face pressure is lower, and a value of the friction factor is smaller as clutch face pressure is higher, the clutch performance varies with a change of a value of the friction factor upon shifting, resulting in possible deterioration of the shift performance.

It is, therefore, an object of the present invention to provide controllers for automatic transmissions which contributes to an improvement in the shift performance.

SUMMARY OF THE INVENTION

According to one aspect of the present invention, there is provided a method of controlling a hydraulic pressure for engaging a clutch in an automatic transmission, comprising the steps of:

determining provisionally the hydraulic pressure in accordance with a measured value representative of input torque and a friction factor of the clutch;

correcting said friction factor in accordance with a relationship between a face pressure of the clutch corresponding to the hydraulic pressure as provisionally determined and said friction factor; and correcting the hydraulic pressure in accordance with said friction factor as corrected.

Another aspect of the present invention lies in correcting, when a variation speed of the hydraulic pressure as corrected with respect to the hydraulic pressure as provisionally determined is larger than a predetermined limiting variation speed, the hydraulic pressure by adding a predetermined hydraulic pressure corresponding to said limiting variation speed to the hydraulic pressure as provisionally determined.

BRIEF DESCRIPTION OF THE DRAWINGS

FIG. 1A is a flowchart showing a normal operation ensured by a method of controlling a clutch in automatic transmission embodying the present invention;

FIG. 1B is a view similar to FIG. 1A, showing a variant of the normal operation.

DETAILED DESCRIPTION OF THE INVENTION

Figure 2:
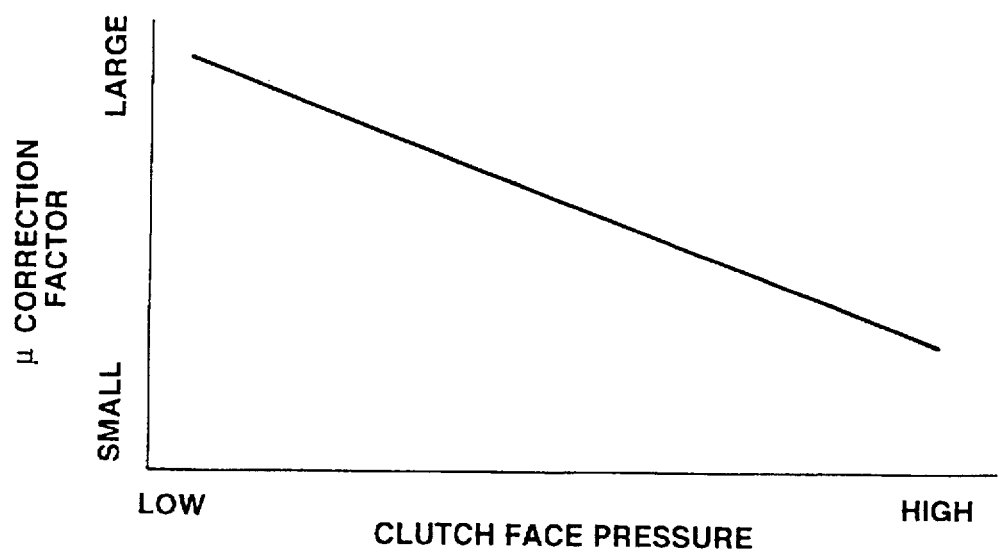
FIG. 2 is a diagram illustrating an example of the relationship between clutch face pressure and friction factor.

Referring to FIG. 1A, a description will be made with regard to a normal operation ensured by a method of controlling a clutch in automatic transmission embodying the present invention. First, at a step 10, an input torque Ti is computed in accordance with a signal indicative of a fuel injection amount or a signal derived from a torque sensor. Then, at a step 20, a moment of inertia I is computed in accordance with the input torque Ti. At a subsequent step 30, a necessary transfer torque Tq of a clutch is computed in accordance with a predetermined provisional friction factor $\mu t$, an effective diameter D of the clutch, a pressing pressure P of a clutch piston resulting from line pressure, a sectional area A of the clutch piston, a force Fs of a return spring for returning the clutch piston, and a number N of driven plates of the clutch: $Tq = \mu t \cdot D \cdot (P \cdot A - Fs) \cdot N$ At a step 40, a necessary clutch engagement hydraulic pressure $P_{C1}$ is competed provisionally. Then, at a step 50, clutch face pressure is determined in accordance with the provisional clutch engagement hydraulic pressure $P_{C1}$ to determine a corresponding $\mu$ correction factor out of a correction diagram as shown in FIG. 2. With this $\mu$ correction factor, the a friction factor $\mu$ is corrected, obtaining a corrected friction factor $\mu 1$. At a subsequent step 60, a corrected clutch engagement hydraulic pressure $P_{C2}$ is determined by carrying out another computing of a clutch engagement hydraulic pressure $P_C$ in applying the corrected friction factor $\mu 1$, then, flow comes to an end.

In such a way, according to the present invention, the friction factor $\mu$ is corrected in accordance with clutch face pressure, with which the clutch engagement hydraulic pressure $P_C$ is corrected in turn, enabling clutch engagement corresponding to an actual shift condition, resulting in excellent shift performance.

When shifting is carried out in accordance with a flowchart as shown in FIG. 1A, an actual variation speed $P_{CC}$ (kgf/cm$^2$)/sec of the clutch engagement hydraulic pressure $P_C$ can be too large, deteriorating a cruising feel. Referring to FIG. 1B, if such a situation is possible, another flowchart is applicable, having modified flow after the step) 40 as shown in FIG. 1A. Specifically, subsequent to the step 40 where the necessary clutch engagement hydraulic pressure $P_{C1}$ is computed provisionally, at a step 45, it is checked whether or not an actual variation speed $P_{CC}$ of the provisional clutch engagement hydraulic pressure $P_{C1}$ is larger than a predetermined limiting variation speed $P_S$ of the clutch engagement hydraulic pressure $P_C$. If the answer at the step 45 is NO, flow proceeds to a step 55 where the friction factor $\mu$ is corrected in the same way as at the step 50, obtaining a corrected friction factor $\mu 1$. At a subsequent step 65, a final clutch engagement hydraulic pressure $P_{C2}$ is determined by carrying out another computing of the clutch engagement hydraulic pressure $P_C$ in applying the corrected friction factor $\mu 1$. On the other hand, at the step 45, if the answer is YES, flow proceeds to a step 66 where a hydraulic pressure with a predetermined upper limit value corresponding to the limiting variation speed $P_S$ is added to the provisional clutch engagement hydraulic pressure $P_{C1}$ to obtain a corrected clutch engagement hydraulic pressure $P_{C21}$, restricting the actual variation speed $P_{CC}$ so as not to exceed a predetermined value. This results in possible prevention of deterioration of a cruising feel due to sudden change in the clutch engagement hydraulic pressure $P_C$.

Having described the present invention in connection with the preferred embodiment, it is noted that the present invention is not limited thereto, and various changes and modifications can be made without departing from the spirit of the present invention.

What is claimed is:

1. A method of controlling a hydraulic pressure for engaging a clutch in an automatic transmission, comprising the steps of:

determining provisionally the hydraulic pressure in accordance with a measured value representative of input torque and a friction factor of the clutch;

correcting said friction factor in accordance with a relationship between a face pressure of the clutch corresponding to the hydraulic pressure as provisionally determined and said friction factor; and correcting the hydraulic pressure in accordance with said friction factor as corrected.

2. A method as claimed in claim 1, further comprising the steps of:

correcting, when a variation speed of the hydraulic pressure as corrected with respect to the hydraulic pressure as provisionally determined is larger than a predetermined limiting variation speed, the hydraulic pressure by adding a predetermined hydraulic pressure corresponding to said limiting variation speed to the hydraulic pressure as provisionally determined.

* * * * *

UNITED STATES PATENT AND TRADEMARK OFFICE
CERTIFICATE OF CORRECTION

PATENT NO. : 5,752,592
DATED : May 19, 1998
INVENTOR(S) : Kyosuke MORI

It is certified that error appears in the above-identified patent and that said Letters Patent is hereby corrected as shown below:

```
  On the title page, item [30] insert the following :
-- Foreign Application Priority Data--, and -- November 8, 1995 [JP]
   Japan ...........7-289622--.
```

Signed and Sealed this

Eighteenth Day of May, 1999

*Attest:*

Q. TODD DICKINSON

*Attesting Officer*   Acting Commissioner of Patents and Trademarks